(12) United States Patent
Behera et al.

(10) Patent No.: US 12,298,864 B2
(45) Date of Patent: May 13, 2025

(54) PREDICTING REPLICATION HEALTH WITH BACKGROUND REPLICATION

(71) Applicant: Dell Products L.P., Round Rock, TX (US)

(72) Inventors: Narayan Behera, Pune (IN); Shilbin Devassy, Pune (IN); Anurag Chandra, Pune (IN); Shiv S. Kumar, Pune (IN)

(73) Assignee: DELL PRODUCTS L.P., Round Rock, TX (US)

( * ) Notice: Subject to any disclaimer, the term of this patent is extended or adjusted under 35 U.S.C. 154(b) by 115 days.

(21) Appl. No.: 18/357,048

(22) Filed: Jul. 21, 2023

(65) Prior Publication Data

US 2025/0028609 A1    Jan. 23, 2025

(51) Int. Cl.
*G06F 11/00* (2006.01)
*G06F 11/07* (2006.01)
*G06F 11/14* (2006.01)

(52) U.S. Cl.
CPC ...... *G06F 11/1466* (2013.01); *G06F 11/0772* (2013.01); *G06F 11/1464* (2013.01)

(58) Field of Classification Search
CPC ............. G06F 11/1466; G06F 11/0772; G06F 11/1464
See application file for complete search history.

(56) References Cited

U.S. PATENT DOCUMENTS

| | | | | |
|---|---|---|---|---|
| 10,452,486 | B2* | 10/2019 | Nanivadekar | G06F 11/1469 |
| 11,461,186 | B2* | 10/2022 | Klus | G06F 11/3423 |
| 2013/0166511 | A1* | 6/2013 | Ghatty | G06F 11/1469 707/649 |
| 2023/0109510 | A1* | 4/2023 | Polimera | G06F 11/1458 714/6.3 |
| 2023/0333936 | A1* | 10/2023 | Chopra | G06F 11/1451 |
| 2023/0333937 | A1* | 10/2023 | Yadav | G06F 11/1435 |

* cited by examiner

*Primary Examiner* — Amine Riad
(74) *Attorney, Agent, or Firm* — Amin, Turocy & Watson, LLP

(57) ABSTRACT

A system can create a group of at least one file on a source computer. The system can perform iterations of backing up the group of at least one file to a destination computer. The system can store respective job status indications of respective iterations of the iterations of backing up the group of at least one file. The system can, in response to determining to back up the data, and in response to determining that the job status indications indicate that at least one iteration of the iterations of backing up the group of at least one file was successful, back up the data to the destination computer, or, in response to determining that the job status indications indicate that the at least one iteration of the iterations of backing up the group of at least one file was unsuccessful, refrain from backing up the data.

20 Claims, 13 Drawing Sheets

700

( 702 )

DETERMINING THAT THE JOB STATUS INDICATIONS INDICATE THAT THE AT LEAST ONE ITERATION OF THE ITERATIONS OF BACKING UP THE GROUP OF AT LEAST ONE FILE WAS UNSUCCESSFUL 704

CREATING AN EVENT OR AN ALERT THAT INDICATES A REASON WHY THE AT LEAST ONE ITERATION OF THE ITERATIONS OF BACKING UP THE GROUP OF AT LEAST ONE FILE WAS UNSUCCESSFUL 706

PERFORMING ITERATIONS OF BACKING UP A GROUP OF AT LEAST ONE FILE FROM A SOURCE COMPUTER TO A DESTINATION COMPUTER, WHERE THE GROUP OF AT LEAST ONE FILE IS CONFIGURED FOR TESTING DATA BACKUP OPERATIONS, AND WHERE THE GROUP OF AT LEAST ONE FILE IS SEPARATE FROM DATA THAT IS TO BE BACKED UP 804

↓

STORING RESPECTIVE JOB STATUS INDICATIONS OF RESPECTIVE ITERATIONS OF THE ITERATIONS OF BACKING UP THE GROUP OF AT LEAST ONE FILE 806

↓

IN RESPONSE TO DETERMINING BACK UP THE DATA, AND IN RESPONSE TO DETERMINING THAT THE JOB STATUS INDICATIONS INDICATE THAT AT LEAST ONE ITERATION OF THE ITERATIONS OF BACKING UP THE GROUP OF AT LEAST ONE FILE WAS SUCCESSFUL, BACKING UP THE DATA TO THE DESTINATION COMPUTER, OR IN RESPONSE TO DETERMINING THAT THE JOB STATUS INDICATIONS INDICATE THAT THE AT LEAST ONE ITERATION OF THE ITERATIONS OF BACKING UP THE GROUP OF AT LEAST ONE FILE WAS UNSUCCESSFUL, REFRAINING FROM BACKING UP THE DATA TO THE DESTINATION COMPUTER 808

RECEIVING REPLICATION MODE DATA ASSOCIATED WITH A USER ACCOUNT, WHERE THE REPLICATION MODE DATA INDICATES TO PERFORM THE ITERATIONS OF BACKING UP THE GROUP OF AT LEAST ONE FILE 904

↓

PERFORMING THE ITERATIONS OF BACKING UP THE GROUP OF AT LEAST ONE FILE 906

↓

908

1000

```
        ( 1002 )
           │
           ▼
┌─────────────────────────────────────────────────────────┐
│ DETERMINING TO PERFORM THE ITERATIONS OF BACKING UP THE GROUP │
│            OF AT LEAST ONE FILE 1004                    │
└─────────────────────────────────────────────────────────┘
           │
           ▼
┌─────────────────────────────────────────────────────────┐
│     CREATING THE GROUP OF AT LEAST ONE FILE 1006        │
└─────────────────────────────────────────────────────────┘
           │
           ▼
        ( 1008 )
```

DETERMINING TO CREATE THE GROUP OF AT LEAST ONE FILE 1104

↓

DETERMINING RESPECTIVE SIZES FOR RESPECTIVE FILES OF THE GROUP OF AT LEAST ONE FILE 1106

↓

CREATING THE RESPECTIVE FILES WITH THE RESPECTIVE SIZES 1108

PREDICTING REPLICATION HEALTH WITH BACKGROUND REPLICATION

BACKGROUND

Computer systems can store data, and this data can be backed up, or otherwise protected against data loss.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can create a group of at least one file on a source computer, wherein the group of at least one file is configured to test data backup operations, and wherein the group of at least one file is separate from data that is to be backed up. The system can perform iterations of backing up the group of at least one file to a destination computer. The system can store respective job status indications of respective iterations of the iterations of backing up the group of at least one file. The system can, in response to determining to back up the data, and in response to determining that the job status indications indicate that at least one iteration of the iterations of backing up the group of at least one file was successful, backing up the data to the destination computer, or, in response to determining that the job status indications indicate that the at least one iteration of the iterations of backing up the group of at least one file was unsuccessful, refraining from backing up the data to the destination computer.

An example method can comprise performing, by a system comprising a processor, iterations of backing up a group of at least one file from a source computer to a destination computer, wherein the group of at least one file is configured for testing data backup operations, and wherein the group of at least one file is separate from data that is to be backed up. The method can further comprise storing, by the system, respective job status indications of respective iterations of the iterations of backing up the group of at least one file. The method can further comprise, in response to determining back up the data, and, in response to determining that the job status indications indicate that at least one iteration of the iterations of backing up the group of at least one file was successful, backing up, by the system, the data to the destination computer, or, in response to determining that the job status indications indicate that at least one iteration of the iterations of backing up the group of at least one file was unsuccessful, refraining from backing up, by the system, the data to the destination computer.

An example non-transitory computer-readable medium can comprise instructions that, in response to execution, cause a system comprising a processor to perform operations. These operations can comprise performing iterations of backing up a group of at least one file from a source computer to a destination computer. These operations can further comprise storing respective job status indications of respective iterations of the iterations of backing up the group of at least one file. These operations can further comprise, in response to determining to back up data, determining whether the job status indications indicate that at least one iteration of the iterations of backing up the group of at least one file was successful. These operations can further comprise, in response to determining that the job status indications indicate that at least one iteration of the iterations of backing up the group of at least one file was successful, backing up the data to the destination computer. These operations can further comprise, in response to determining that the job status indications indicate that at least one iteration of the iterations of backing up the group of at least one file was unsuccessful, refraining from backing up the data to the destination computer.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 7 illustrates another example process flow that can facilitate predicting replication health with background replication, in accordance with an embodiment of this disclosure;

FIG. 8 illustrates another example process flow that can facilitate predicting replication health with background replication, in accordance with an embodiment of this disclosure;

FIG. 10 illustrates another example process flow that can facilitate predicting replication health with background replication, in accordance with an embodiment of this disclosure;

FIG. 11 illustrates another example process flow that can facilitate predicting replication health with background replication, in accordance with an embodiment of this disclosure;

DETAILED DESCRIPTION

Overview

Figure 1:
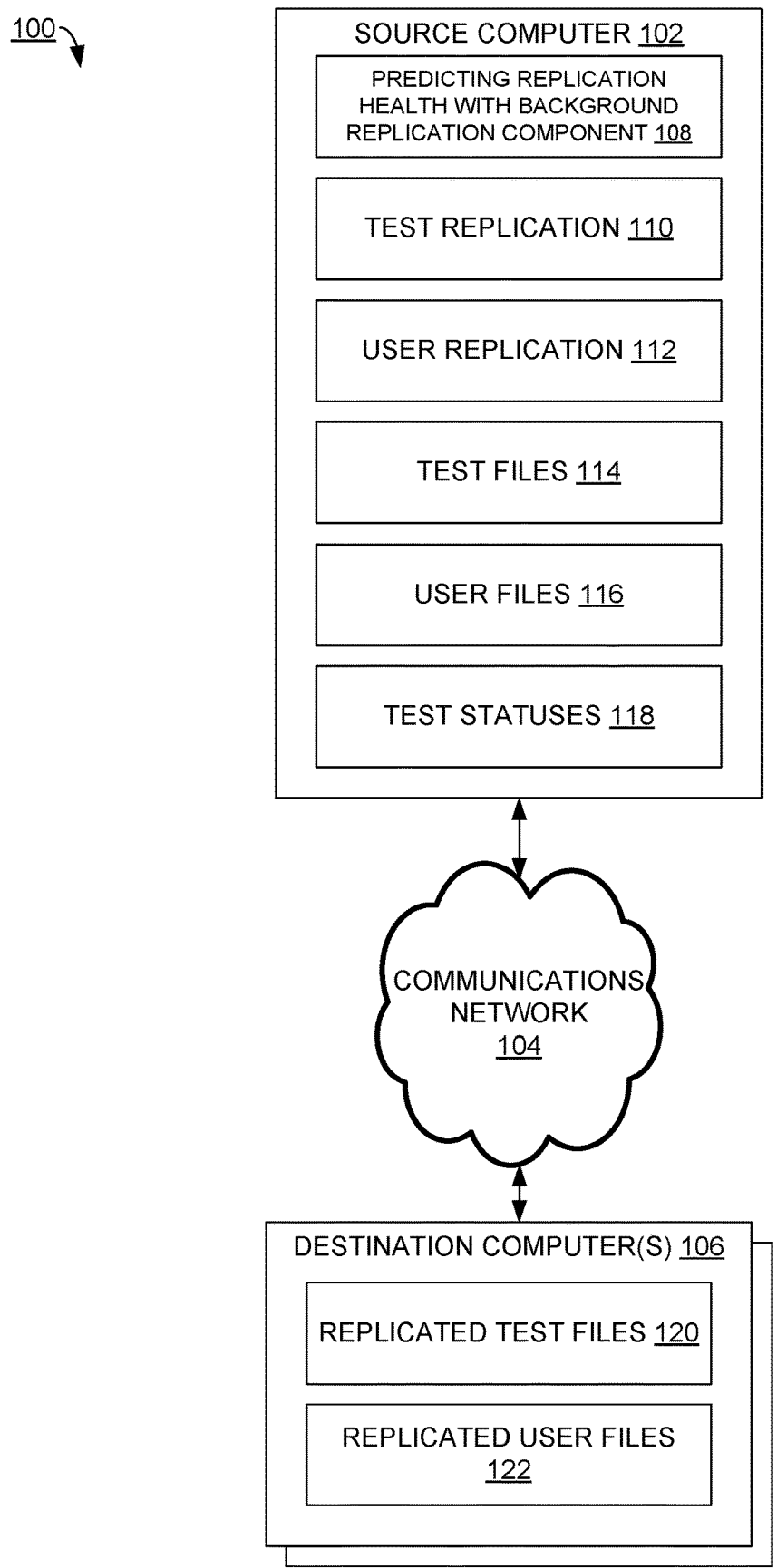
FIG. 1 illustrates an example system architecture that can facilitate predicting replication health with background replication, in accordance with an embodiment of this disclosure.

The examples herein generally relate to replicating or migrating files from a source computer to target, or destination, computer(s). It can be appreciated that the present techniques can be applied to other types of data protection scenarios. In some examples, the source computer and/or the target computer(s) can comprise a computing cluster that comprises a group of computers that are interconnected and function as one logical computing system.

Replication can generally comprise a form of data protection where data on one computer is copied or migrated to another computer. Iterations of a replication can generally be performed on a schedule. In some examples, an iteration of a replication job can fail.

Where a user can predict or know a failure of a replication job in advance, this can aid this user in planning data recovery.

In an example, there can be a user-scheduled replication of a directory or a file to a target computer. It can be that, when this replication job has started replicating the directory or file, it fails midway through the replication because of one or more issues, such as network issues, a lack of available compute resources, and/or transient issues.

It can be that the user is unaware in advance about these issue(s) that cause the replication job to fail. Then, where a replication job fails, there can be a user escalation of the problem due to this replication job failure.

In some prior approaches, there is a problem where a user lacks a prior warning or alert that the replication will fail due to some reason. In some prior approaches, there is a problem related to re-syncing all files—or the affected files—in a replication due to low network bandwidth, which can cause unnecessary consumption of system and network resources. In some prior approaches, there is a problem with the impact of re-syncing a replication job on a disaster recovery time objective (RTO).

The present techniques can be implemented to eliminate or mitigate these problems with prior approaches. The present techniques can be implemented to facilitate predicting a replication job failure before the replication job begins. The present techniques can be implemented to facilitate recommending a time to start the replication.

Consider an example where a file is to be replicated on a source computer. Before starting the corresponding replication job, it can be that there is not prior knowledge of whether the job will succeed or failure.

The present techniques can be implemented to provide a mechanism to predict a replication failure and generate an alert or warning about the possible failure of the replication job before the replication job starts. Additionally, the present techniques can be implemented to suggest an alternative time (which can be a best alternative time, by some metric) to start the replication. This can aid a user in knowing when to perform replications, and can lead to improved performance of the replication job, as well as an improved RTO during a data recovery.

In some examples, it can be that a user is only aware of replication issues after those replication issues occur, meaning that a user can set up a replication job, perform corresponding actions, and the replication job can run for a while before failing. At such a stage, it can be that the only option is to be reactive (in contrast to being proactive), and then work with a support organization of the replication and an engineering organization of the replication to fix underlying issues before restarting the replication.

The present techniques can generally be referred to as "lazy replication," and instances of a lazy replication can be implemented at short intervals (where the interval length can be user-defined, and or automatically determined). Lazy replication can generally comprise continuously (or in a series of ongoing, discrete, iterations) sending a group of files from a source to a target (in some examples, when bandwidth and compute resources are available to do so) to test a status of the replication job's ability to perform a replication.

That is, replication can incorporate a lazy replication mode that sends files to test for replication success, and/or failover/failback success. These techniques can be applied to other types of data protection/recovery workflows. These techniques can be implemented to improve replication efficiency by predicting a replication failure and corrective action at a user site.

In some examples, lazy replication can be enabled by a user on the user's computer. Where lazy replication mode it enabled, the following can occur.

In a first phase, test files can be created on a source computer. A replication can be setup from the source to a destination computer. This replication job can be run at intervals. Information about a job status of iterations of the replication job can be stored. Where there is a job failure, an event and/or warning about the job can be created, which can identify a reason for the failure.

In a second phase, for a new replication job (e.g., a replication job that the user configures and that is different from the iterations of the "lazy replication mode" replication job in the first phase), a status of a last-known "lazy replication mode" job can be checked. Where the status indicates that the job failed, issues can be identified and fixed.

In some examples, the present techniques can be implemented by creating dummy file(s), which can have a user-configurable size, and or a size that is automatically determined. These files can be created for a purpose of performing lazy replication mode replication jobs, and can be separate from user data.

A replication job can be started to replicate these dummy files to a destination computer. Where the replication job fails, a (possibly critical) alert can be raised, such as on the source computer.

The replication feature can be continuously monitored. A system that implements the present techniques can wait for a period of time, and then return to check a replication feature status between the source and the destination computer.

When a user's replication job is to start, there can be a check for an alert from the lazy replication mode replication job. Where there is no alert for a replication failure, then the user replication job can be started.

Where there is a replication failure, an alert can be raised to fix a corresponding issue.

Example Architecture

FIG. 1 illustrates an example system architecture 100 that can facilitate predicting replication health with background replication, in accordance with an embodiment of this disclosure.

System architecture 100 comprises source computer 102, communications network 104, and destination computer(s) 106. In turn, source computer 102 comprises predicting replication health with background replication component 108, test replication 110, user replication 112, test files 114, user files 116, and test statuses 118; and destination computer(s) 106 comprises replicated test files 120 and replicated user files 122.

Figure 13:
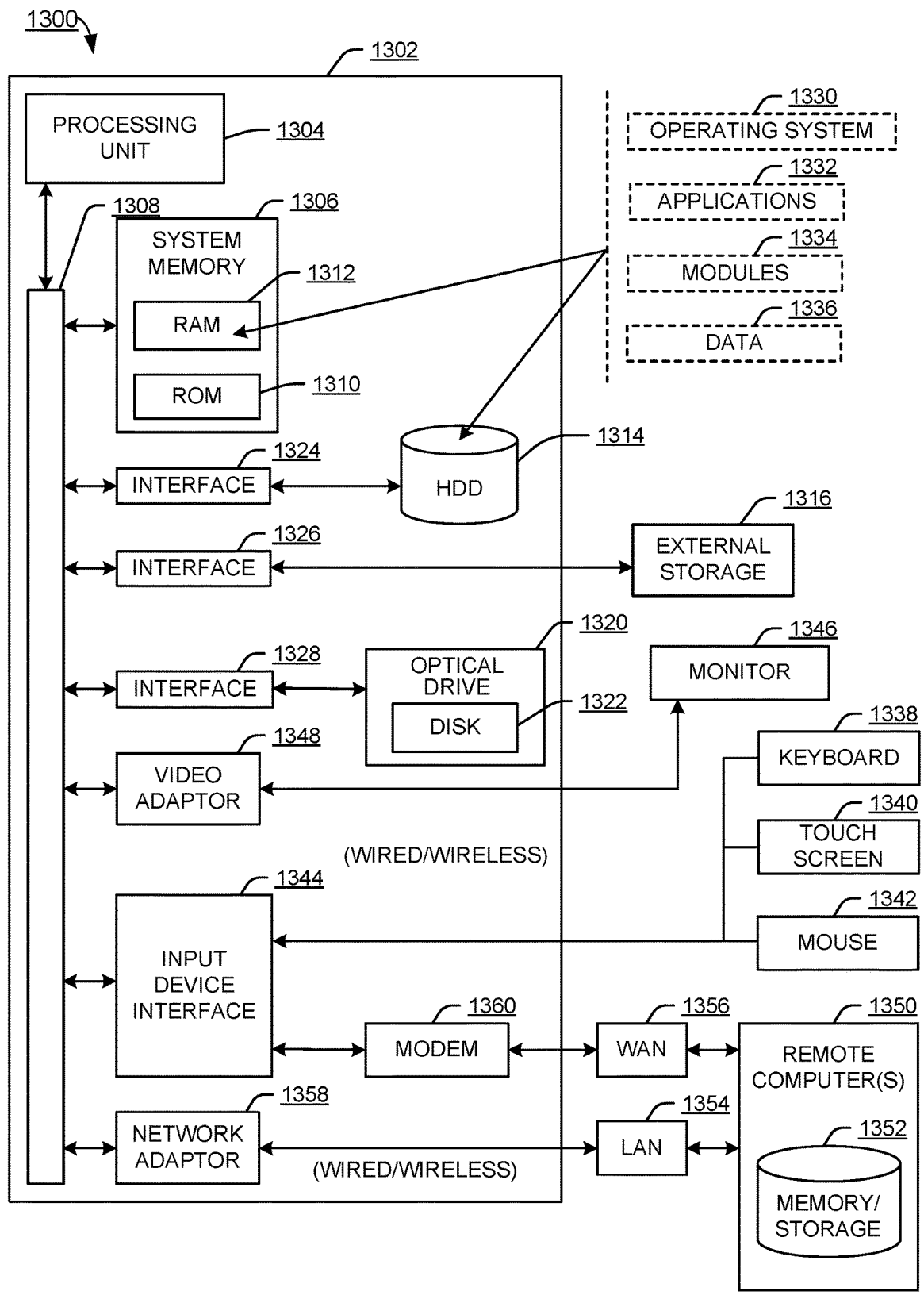
FIG. 13 illustrates an example block diagram of a computer operable to execute an embodiment of this disclosure.

Each of source computer 102 and/or destination computer(s) 106 can be implemented with part(s) of computing environment 1300 of FIG. 13. Destination computer(s) 106 can comprise one or more computers, where a replication can be performed to one or more computers, or different replications from source computer 102 can be performed to different destination computers.

Communications network 104 can comprise a computer communications network, such as the Internet.

Source computer 102 can comprise one or more computers that are configured to store computer data. This data can be backed up to destination computers(s) 106 via a replication process. For instance, source computer 102 can store user files 116, and user replication 112 can comprise a configuration for a replication job to replicate user files 116 to destination computer(s) 106 (which store the replicated data of user files 116 as replicated user files 122).

Source computer 102 can also store data and a replication configuration to facilitate predicting replication health with background replication. That is, source computer 102 can store test files 114 and test replication 110, where test replication 110 can comprise a configuration for a replication job to replicate test files 114 to destination computer(s) 106 (which store the replicated data of test files 114 as replicated test files 120).

Replications of test files 114 can generally comprise background replications that are used to generally identify whether or not replications are currently successful. It can be that the goal of this replication is not to actually replicate test files 114 as a form of data replication, but rather to determine the viability of replicating user files 116 before that replication occurs (so as to prevent initiating a replication that is determined to be unsuccessful, or likely to be unsuccessful).

In a process of performing iterations of replicating test files 114, predicting replication health with background replication component 108 can determine whether there is an issue that prevents replication, and a success or failure of these iterations can be stored as test statuses 118. This information in test statuses 118 can be used to determine whether to perform a replication of user files 116 at a time that user replication 112 indicates that a replication is to occur.

In some examples, predicting replication health with background replication component 108 can implement part(s) of the process flows of FIGS. 2-12 to implement predicting replication health with background replication.

It can be appreciated that system architecture 100 is one example system architecture for predicting replication health with background replication, and that there can be other system architectures that facilitate predicting replication health with background replication.

Example Process Flows

Figure 2:
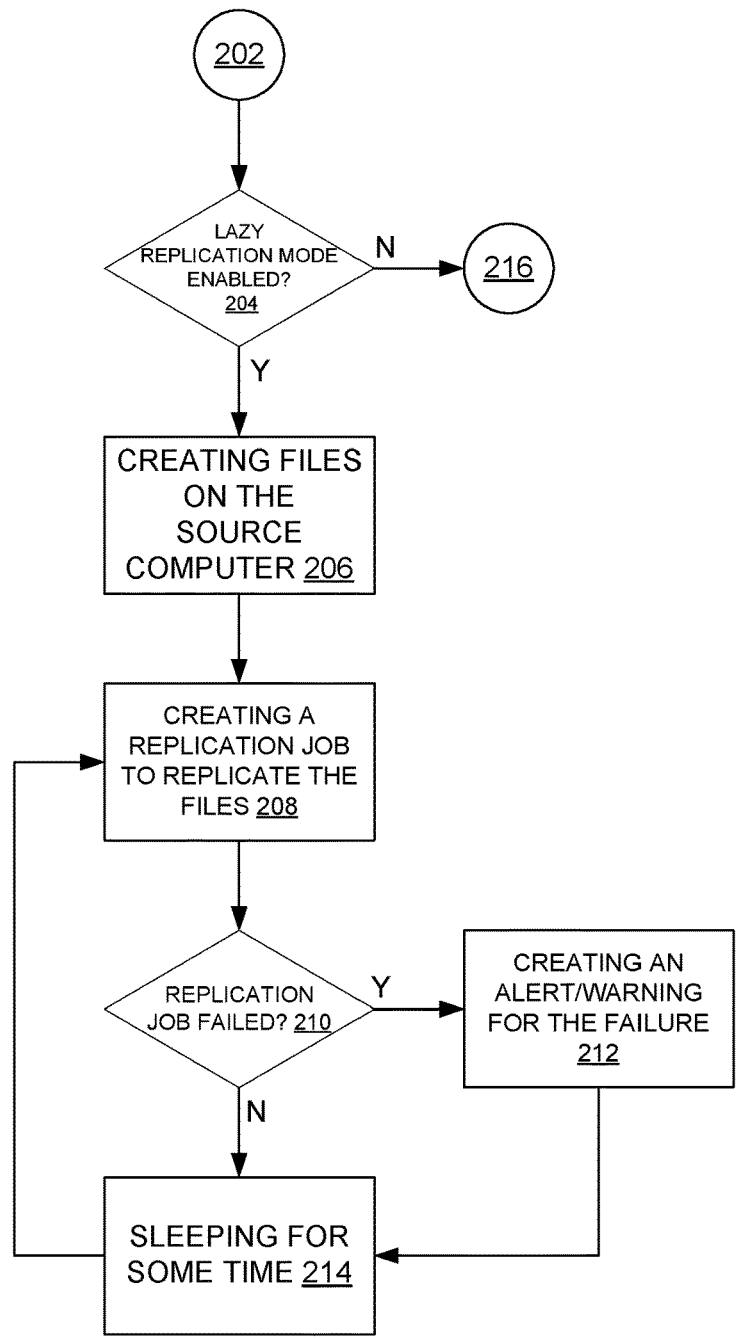
FIG. 2 illustrates an example process flow for establishing monitoring a replication status, and that can facilitate predicting replication health with background replication, in accordance with an embodiment of this disclosure.

FIG. 2 illustrates an example process flow 200 for establishing monitoring a replication status, and that can facilitate predicting replication health with background replication, in accordance with an embodiment of this disclosure. In some examples, one or more embodiments of process flow 200 can be implemented by predicting replication health with background replication component 108 of FIG. 1, or computing environment 1300 of FIG. 13.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 200 begins with 202, and moves to operation 204.

Operation 204 depicts determining whether lazy replication mode is enabled. This can involve determining whether user input data indicative of enabling a lazy replication mode has been received, and/or determining whether there is an automatic setting that indicates enabling lazy replication mode that is independent of receiving user input data.

Where in operation 204 it is determined that lazy replication mode is enabled, process flow 200 moves to operation 206. Instead, where in operation 204 it is determined that lazy replication mode is not enabled, process flow 200 moves to 216, where process flow 200 ends.

Operation 206 is reached from operation 204 where it is determined that lazy replication mode is enabled. Operation 206 depicts creating files on the source computer. These files can be similar to test files 114 of FIG. 1, and can be distinguished from user files 116, for example, because they are created as part of implementing process flow 200 and are used specifically for a lazy replication mode, rather than as part of receiving user input data indicative of creating user files.

After operation 206, process flow 200 moves to operation 208.

Operation 208 is reached from operation 208 or operation 214. Operation 208 depicts creating a replication job to replicate the files. This replication job can be similar to test replication 110, and can be a replication job created specifically for a lazy replication mode, rather than a replication job to directly replicate user data.

After operation 208, process flow 200 moves to operation 210.

Operation 210 depicts determining whether the replication job failed. This can comprise predicting replication health with background replication component 108 of FIG. 1 determining whether performing an instance of a replication configured by test replication 110 succeeded or failed.

Where it is determined in operation 210 that the replication job failed, process flow 200 moves to operation 212. Instead, where it is determined in operation 210 that the replication job did not fail, process flow 200 moves to operation 214.

Operation 212 is reached from operation 210 where it is determined that the replication job failed. Operation 212 depicts creating an alert/warning for the failure. This can be an alert/warning that is created on source computer 102 of FIG. 1 and that is directed to a user account that is associated with user replication 112.

After operation 212, process flow 200 moves to operation 214.

Operation 214 is reached from operation 210 where it is determined that the replication job did not fail, or from operation 212. Operation 214 depicts sleeping for some time. Where iterations of performing test replications are performed, an interval of rest can be taken between performing successive iterations, and this can be implemented by waiting, or sleeping, in operation 214 before performing another iteration.

After operation 214, process flow 200 returns to operation 208.

Figure 3:
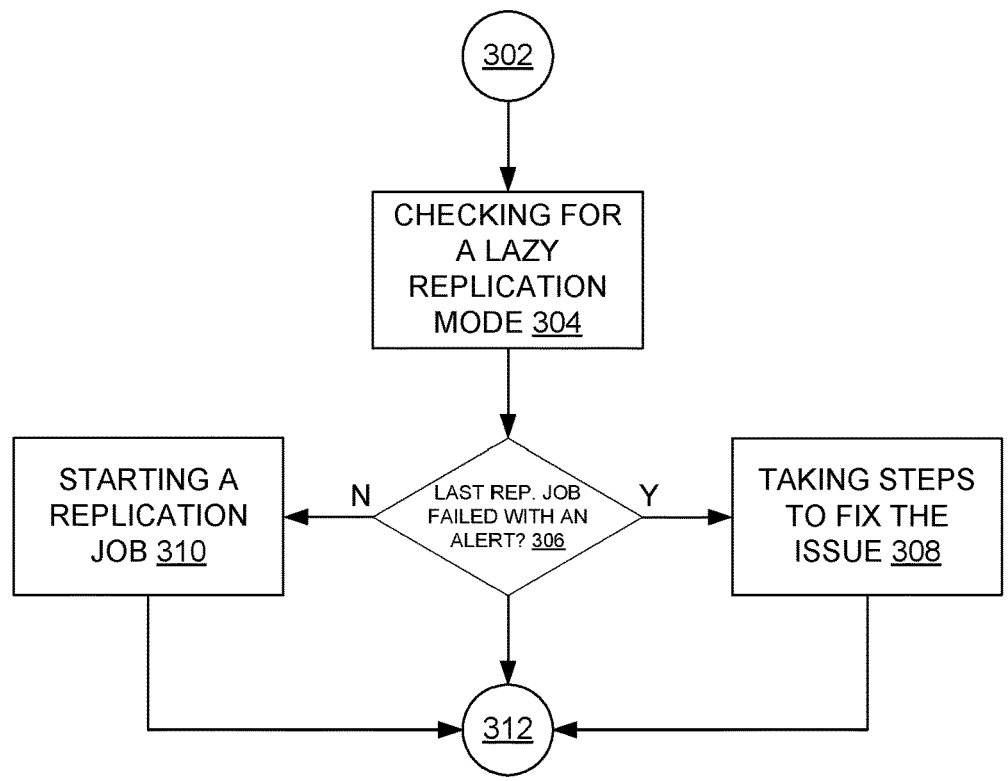
FIG. 3 illustrates an example process flow for predicting a replication failure, and that can facilitate predicting replication health with background replication, in accordance with an embodiment of this disclosure.

FIG. 3 illustrates an example process flow 300 for predicting a replication failure, and that can facilitate predicting replication health with background replication, in accordance with an embodiment of this disclosure. In some examples, one or more embodiments of process flow 300 can be implemented by predicting replication health with background replication component 108 of FIG. 1, or computing environment 1300 of FIG. 13.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 200 of FIG. 2, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 300 begins with 302, and moves to operation 304.

Operation 304 depicts checking for a lazy replication mode. This can comprise determining whether a lazy replication mode has been enabled on source computer 102 of FIG. 1, and can be implemented in a similar manner as operation 204 of FIG. 2.

After operation 304, process flow 300 moves to operation 306.

Operation 306 depicts determining whether the last replication job failed with an alert. This can comprise checking test statuses 118 of FIG. 1. In some examples, the check can be of whether any status of test statuses 118 indicates a failure. In other examples, this can comprise checking whether there has been a failure since a last time a failure was identified (and a user replication paused until a cause of the failure was addressed).

Where it is determined in operation 306 that the last replication job failed with an alert, process flow 300 moves to operation 308. Instead, where it is determined in operation 306 that the last replication job did not fail with an alert, process flow 300 moves to operation 310.

Operation 308 is reached from operation 306 where it is determined in that the last replication job failed with an alert. Operation 308 depicts taking steps to fix the issue. This can comprise fixing a reason that the replication failed, such as a lack of network bandwidth, computer storage, or compute resources available for replications.

After operation 308, process flow 300 moves to 312, where process flow 300 ends.

Operation 310 is reached from operation 306 where it is determined in that the last replication job did not fail with an alert. Operation 310 depicts starting a replication job. This can comprise starting a replication configured by user replication 112 of FIG. 1, and can be a replication of user data (which can be distinguished from test replications performed as part of a lazy replication mode).

After operation 310, process flow 300 moves to 312, where process flow 300 ends.

Figure 4:
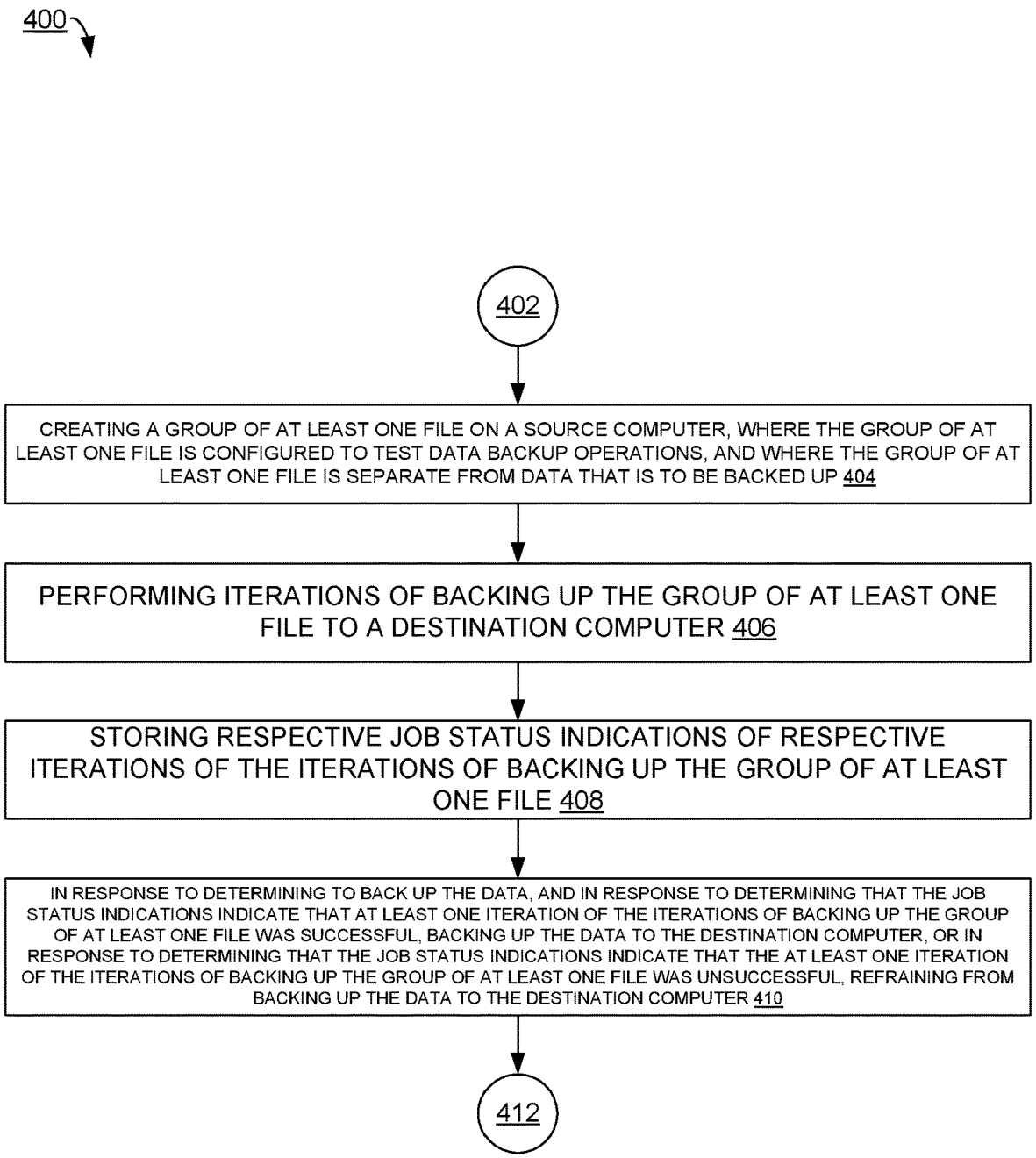
FIG. 4 illustrates an example process flow that can facilitate predicting replication health with background replication, in accordance with an embodiment of this disclosure.

FIG. 4 illustrates an example process flow 400 that can facilitate predicting replication health with background replication, in accordance with an embodiment of this disclosure. In some examples, one or more embodiments of process flow 400 can be implemented by predicting replication health with background replication component 108 of FIG. 1, or computing environment 1300 of FIG. 13.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 200 of FIG. 2, process flow 300 of FIG. 3, process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 400 begins with 402, and moves to operation 404.

Operation 404 depicts creating a group of at least one file on a source computer, where the group of at least one file is configured to test data backup operations, and where the group of at least one file is separate from data that is to be backed up. Using the example of FIG. 1, the source computer can be source computer 102, the group of at least one file can be test files 114, and the data that is to be backed up can be user files 116.

After operation 404, process flow 400 moves to operation 406.

Operation 406 depicts performing iterations of backing up the group of at least one file to a destination computer. Continuing with the example of FIG. 1, this can comprise performing iterations of test replication 110 to replicate test files 114 to destination computer(s) 106.

In some examples, respective iterations of the iterations of backing up the group of at least one file are performed at a time interval, and where a value of the time interval is determined in response to receiving time interval data associated with a user account. In some examples, respective iterations of the iterations of backing up the group of at least one file are performed at a time interval, and where a value of the time interval is determined independently of receiving time interval data associated with a user account. That is, iterations of lazy replication can be performed at intervals, where an amount of time between each interval can be user-defined and/or automatically defined.

After operation 406, process flow 400 moves to operation 408.

Operation 408 depicts storing respective job status indications of respective iterations of the iterations of backing up the group of at least one file. Continuing with the example of FIG. 1, this can comprise maintaining test statuses 118.

In some examples, the respective job status indications indicate whether the respective iterations of backing up the group of at least one file succeeded. That is, a job status can indicate whether there has been a replication success. In some examples, the respective job status indications indicate whether was a failover success or a failback success associated with the respective iterations of backing up the group of at least one file succeeded. That is, a job status can indicate whether there has been a failover/failback success.

After operation 408, process flow 400 moves to operation 410.

Operation 410 depicts, in response to determining to back up the data, and in response to determining that the job status indications indicate that at least one iteration of the iterations of backing up the group of at least one file was successful, backing up the data to the destination computer, or in response to determining that the job status indications indicate that the at least one iteration of the iterations of backing up the group of at least one file was unsuccessful, refraining from backing up the data to the destination computer. Continuing the example of FIG. 1, this can comprise, where test statuses 118 indicate that the instances of test replication 110 were successful, performing user replication 112 on user files 116. And, where test statuses 118 indicate that the instances of test replication 110 were unsuccessful (e.g., a most recent test status, or a test status that indicates a failure, where the failure has not yet been resolved), refraining from performing user replication 112 on user files 116 at the current time.

After operation 410, process flow 400 moves to 412, where process flow 400 ends.

Figure 5:
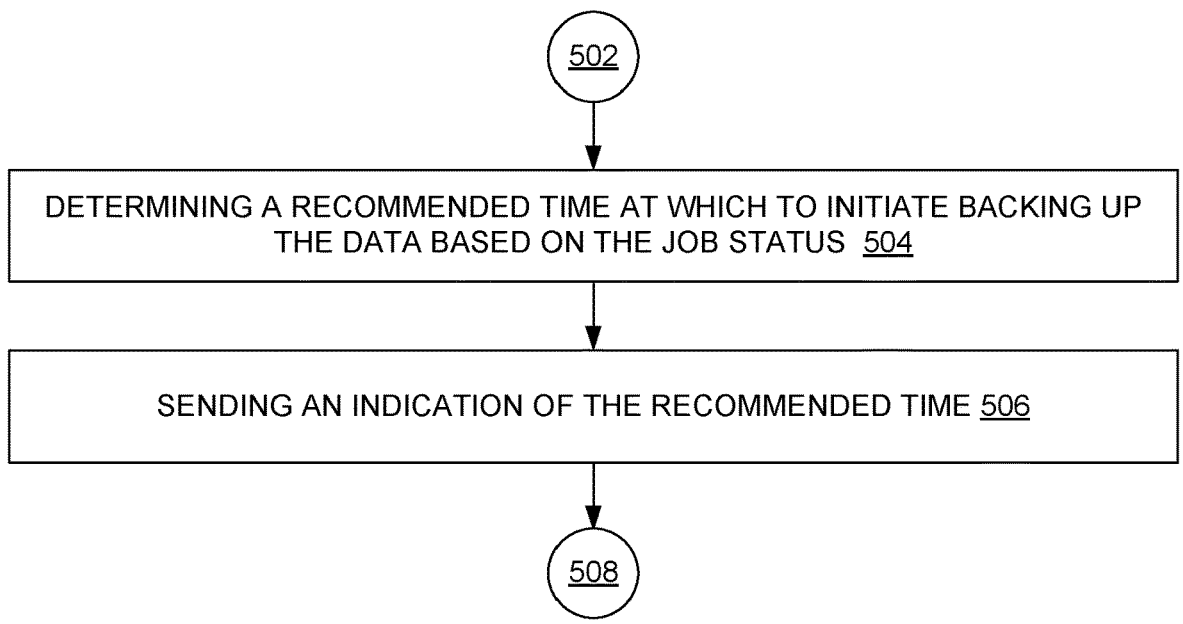
FIG. 5 illustrates another example process flow that can facilitate predicting replication health with background replication, in accordance with an embodiment of this disclosure.

FIG. 5 illustrates an example process flow 500 that can facilitate predicting replication health with background replication, in accordance with an embodiment of this disclosure. In some examples, one or more embodiments of process flow 500 can be implemented by predicting replication health with background replication component 108 of FIG. 1, or computing environment 1300 of FIG. 13.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 200 of FIG. 2, process flow 300 of FIG. 3, process flow 400 of FIG. 4, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 500 begins with 502, and moves to operation 504.

Operation 504 depicts determining a recommended time at which to initiate backing up the data based on the job status indications. That is, a system that implements the present techniques can use information about test replications (e.g., whether they succeeded or failed, and metadata such as a time at which they occurred and/or a system characteristics at that time (e.g., available bandwidth and/or compute)) to predict a future time at which a replication will be successful (as opposed to file).

After operation 504, process flow 500 moves to operation 506.

Operation 506 depicts sending an indication of the recommended time. This can comprise sending the indication to a user account that is associated with a target computer for which replications are being performed.

After operation 506, process flow 500 moves to 508, where process flow 500 ends.

Figure 6:
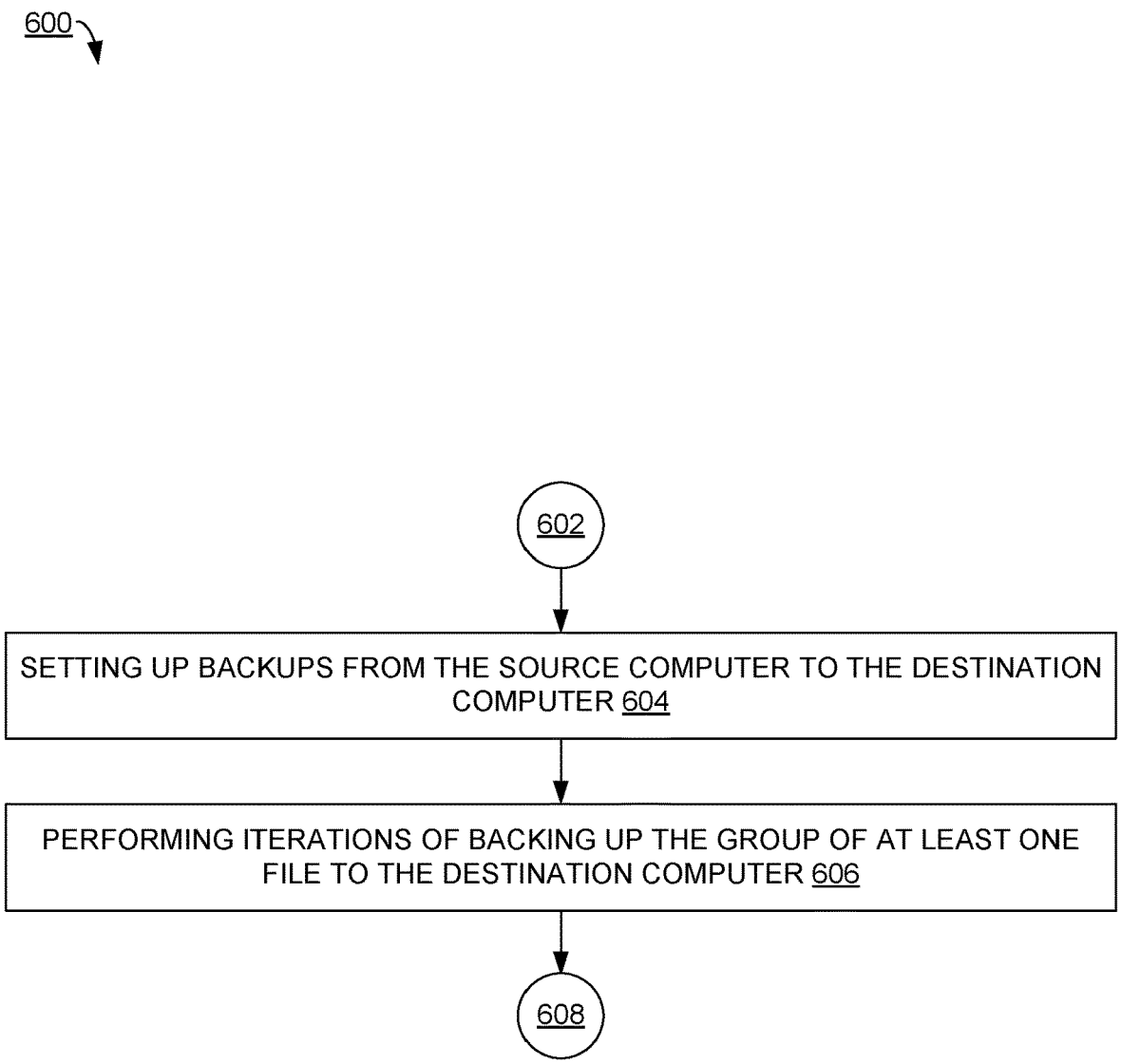
FIG. 6 illustrates another example process flow that can facilitate predicting replication health with background replication, in accordance with an embodiment of this disclosure.

FIG. 6 illustrates an example process flow 600 that can facilitate predicting replication health with background replication, in accordance with an embodiment of this disclosure. In some examples, one or more embodiments of process flow 600 can be implemented by predicting replication health with background replication component 108 of FIG. 1, or computing environment 1300 of FIG. 13.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 200 of FIG. 2, process flow 300 of FIG. 3, process flow 400 of FIG. 4, process flow 500 of FIG. 5, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 600 begins with 602, and moves to operation 604.

Operation 604 depicts setting up backups from the source computer to the destination computer. That can comprise configuring test replication 110 of FIG. 1 such that it indicates to perform replications of test files 114 to destination computer(s) 106.

After operation 604, process flow 600 moves to operation 606.

Operation 606 depicts performing iterations of backing up the group of at least one file to the destination computer. That is, multiple instances of performing a replication according to test replication 110 of FIG. 1 can be performed.

After operation 606, process flow 600 moves to 608, where process flow 600 ends.

FIG. 7 illustrates an example process flow 700 that can facilitate predicting replication health with background replication, in accordance with an embodiment of this disclosure. In some examples, one or more embodiments of process flow 700 can be implemented by predicting replication health with background replication component 108 of FIG. 1, or computing environment 1300 of FIG. 13.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 800 of FIG. 8, process flow 900 of FIG. 9, process flow 1000 of FIG. 10, process flow 1100 of FIG. 11, and/or process flow 1200 of FIG. 12.

Process flow 700 begins with 702, and moves to operation 704.

Operation 704 depicts determining that the job status indications indicate that the at least one iteration of the iterations of backing up the group of at least one file was unsuccessful. This can comprise determining that an instance of performing test replication 110 was unsuccessful.

After operation 704, process flow 700 moves to operation 706.

Operation 706 depicts creating an event or an alert that indicates a reason why the at least one iteration of the iterations of backing up the group of at least one file was unsuccessful. This event or alert can be directed to a user account that is associated with source computer 102 of FIG. 1.

After operation 706, process flow 700 moves to 708, where process flow 700 ends.

FIG. 8 illustrates an example process flow 800 that can facilitate predicting replication health with background replication, in accordance with an embodiment of this disclosure. In some examples, one or more embodiments of process flow 800 can be implemented by predicting replication health with background replication component 108 of FIG. 1, or computing environment 1300 of FIG. 13.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 900 of FIG. 9, process flow 1000 of FIG. 10, process flow 1100 of FIG. 11, and/or process flow 1200 of FIG. 12.

Process flow 800 begins with 802, and moves to operation 804.

Operation 804 depicts performing iterations of backing up a group of at least one file from a source computer to a destination computer, where the group of at least one file is configured for testing data backup operations, and where the group of at least one file is separate from data that is to be backed up. In some examples, operation 804 can be implemented in a similar manner as operation 406 of FIG. 4.

In some examples, operation 804 comprises raising an alert in response to determining that a first iteration of the iterations has failed.

After operation 804, process flow 800 moves to operation 806.

Operation 806 depicts storing respective job status indications of respective iterations of the iterations of backing up the group of at least one file. In some examples, operation 806 can be implemented in a similar manner as operation 408 of FIG. 4.

After operation 806, process flow 800 moves to operation 808.

Operation 808 depicts, in response to determining back up the data, and in response to determining that the job status indications indicate that at least one iteration of the iterations of backing up the group of at least one file was successful, backing up the data to the destination computer, or in response to determining that the job status indications indicate that the at least one iteration of the iterations of backing up the group of at least one file was unsuccessful, refraining from backing up the data to the destination computer. In some examples, operation 808 can be implemented in a similar manner as operation 410 of FIG. 4.

In some examples, operation 808 comprises determining a recommended time at which to initiate backing up the data based on the job status indications, and sending an indication of the recommended time.

After operation 808, process flow 800 moves to 810, where process flow 800 ends.

Figure 9:
FIG. 9 illustrates another example process flow that can facilitate predicting replication health with background replication, in accordance with an embodiment of this disclosure.

FIG. 9 illustrates an example process flow 900 that can facilitate predicting replication health with background replication, in accordance with an embodiment of this disclosure. In some examples, one or more embodiments of process flow 900 can be implemented by predicting replication health with background replication component 108 of FIG. 1, or computing environment 1300 of FIG. 13.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 1000 of FIG. 10, process flow 1100 of FIG. 11, and/or process flow 1200 of FIG. 12.

Process flow 900 begins with 902, and moves to operation 904.

Operation 904 depicts receiving replication mode data associated with a user account, where the replication mode data indicates to perform the iterations of backing up the group of at least one file. That is, a user account can enable a lazy replication mode on its computer.

After operation 904, process flow 900 moves to operation 906.

Operation 906 depicts performing the iterations of backing up the group of at least one file. That is, performing the iterations of backing up the group of at least one file can be performed to effectuate a lazy replication mode, and can be performed because a user account enables a lazy replication mode on its computer.

After operation 906, process flow 900 moves to 908, where process flow 900 ends.

FIG. 10 illustrates an example process flow 1000 that can facilitate predicting replication health with background replication, in accordance with an embodiment of this disclosure. In some examples, one or more embodiments of process flow 1000 can be implemented by predicting replication health with background replication component 108 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1100 of FIG. 11, and/or process flow 1200 of FIG. 12.

Process flow 1000 begins with 1002, and moves to operation 1004.

Operation 1004 depicts determining to perform the iterations of backing up the group of at least one file. That is, a lazy replication mode for a target computer can be enabled.

After operation 1004, process flow 1000 moves to operation 1006.

Operation 1006 depicts creating the group of at least one file. That is, dummy files can be created for facilitating a lazy replication mode, and can be created because a lazy replication mode has been enabled. These dummy files can be similar to test files 114 of FIG. 1, and, in some examples, can be distinguished from user data, such as user files 116.

After operation 1006, process flow 1000 moves to 1008, where process flow 1000 ends.

FIG. 11 illustrates an example process flow 1100 that can facilitate predicting replication health with background replication, in accordance with an embodiment of this disclosure. In some examples, one or more embodiments of process flow 1100 can be implemented by predicting replication health with background replication component 108 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1200 of FIG. 12.

Process flow 1100 begins with 1102, and moves to operation 1104.

Operation 1104 depicts determining to create the group of at least one file. These can be similar to test files 114 of FIG. 1, and be created for a purpose of being replicated in accordance with test replication 110.

After operation 1104, process flow 1100 moves to operation 1106.

Operation 1106 depicts determining respective sizes for respective files of the group of at least one file. In some examples, this can be based on file size data received from a user account. That is, dummy file size can be user configurable. In some examples, determining the respective sizes can be performed independently of receiving file size data from a user account. That is, dummy file size can be automatically identified.

After operation 1106, process flow 1100 moves to operation 1108.

Operation 1108 depicts creating the respective files with the respective sizes. That is, test files 114 of FIG. 1 can be created with file sizes identified in operation 1106.

After operation 1108, process flow 1100 moves to 1110, where process flow 1100 ends.

Figure 12:
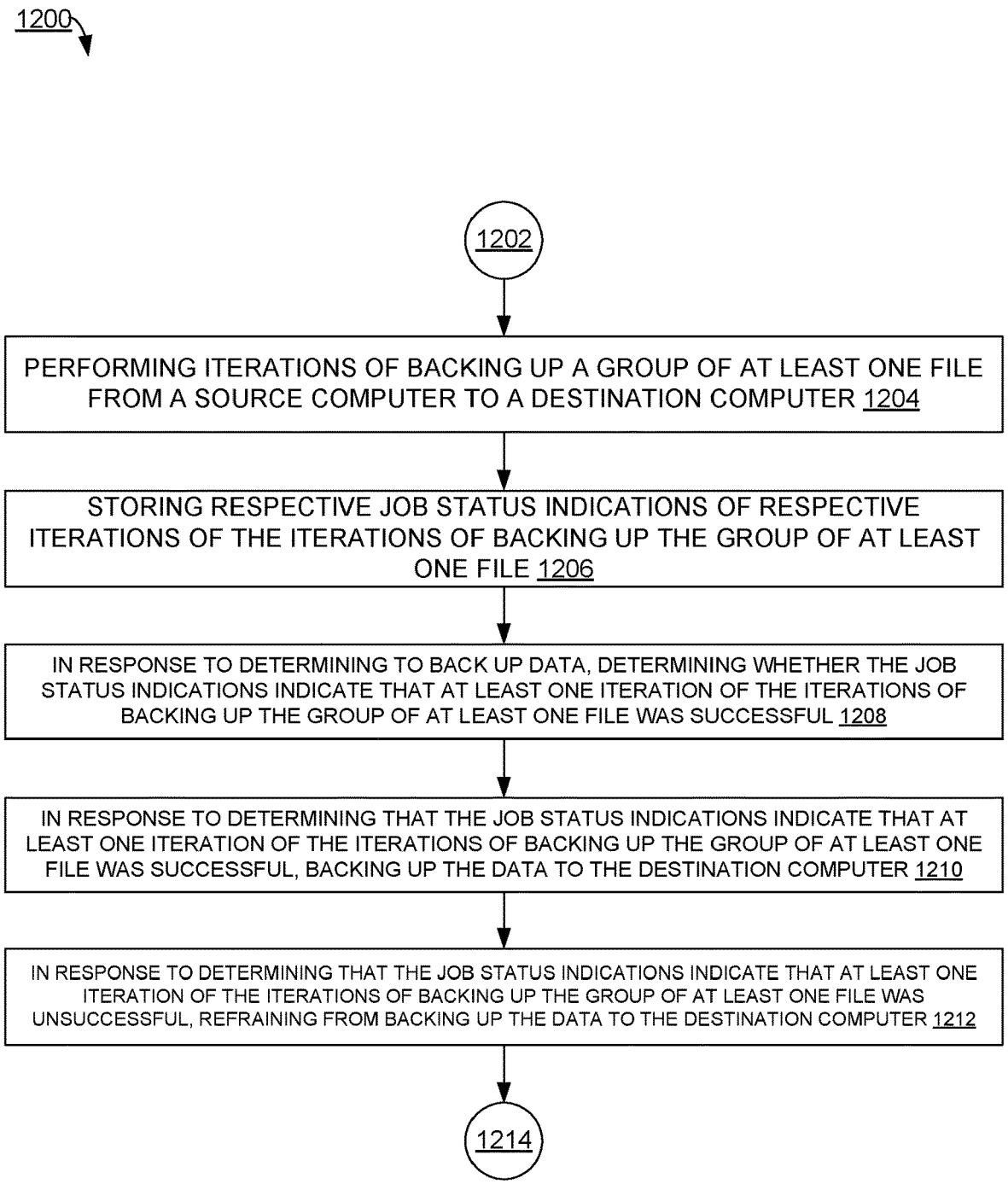
FIG. 12 illustrates another example process flow that can facilitate predicting replication health with background replication, in accordance with an embodiment of this disclosure.

FIG. 12 illustrates an example process flow 1200 that can facilitate predicting replication health with background replication, in accordance with an embodiment of this disclosure. In some examples, one or more embodiments of process flow 1200 can be implemented by predicting replication health with background replication component 108 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 1200 begins with 1202, and moves to operation 1204.

Operation 1204 depicts performing iterations of backing up a group of at least one file from a source computer to a destination computer. In some examples, operation 1204 can be implemented in a similar manner as operation 406 of FIG. 4.

In some examples, respective iterations of the iterations are initiated after respective time intervals of a time interval have passed.

After operation 1204, process flow 1200 moves to operation 1206.

Operation 1206 depicts storing respective job status indications of respective iterations of the iterations of backing up the group of at least one file. In some examples, operation 1206 can be implemented in a similar manner as operation 408 of FIG. 4.

After operation 1206, process flow 1200 moves to operation 1208.

Operation 1208 depicts, in response to determining to back up data, determining whether the job status indications indicate that at least one iteration of the iterations of backing up the group of at least one file was successful. In some examples, operation 1208 can be implemented in a similar manner as operation 410 of FIG. 4.

In some examples, the group of at least one file is configured for testing data backup operations, and the data differs from the group of at least one file.

After operation 1208, process flow 1200 moves to operation 1210.

Operation 1210 depicts, in response to determining that the job status indications indicate that at least one iteration of the iterations of backing up the group of at least one file was successful, backing up the data to the destination computer. In some examples, operation 1210 can be implemented in a similar manner as operation 408 of FIG. 4.

After operation 1210, process flow 1200 moves to operation 1212.

Operation 1212 depicts, in response to determining that the job status indications indicate that at least one iteration of the iterations of backing up the group of at least one file was unsuccessful, refraining from backing up the data to the destination computer. In some examples, operation 1212 can be implemented in a similar manner as operation 408 of FIG. 4.

It can be appreciated that operations 1210 and 1212 can present alternate operations to implement based on what the job status indications indicate. While process flow 1200 illustrates performing both operations 1210 and operation 1212, it can be appreciated that it can be that one of these two operations is implemented, based on what the job status indications indicate.

In some examples, operation 1212 comprises determining a recommended time at which to initiate backing up the data based on the job status indications, and sending an indication of the recommended time.

After operation 1212, process flow 1200 moves to 1214, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of source computer 102, and/or destination computer(s) 106 of FIG. 1.

In some examples, computing environment 1300 can implement one or more embodiments of the process flows of FIGS. 2-12 to facilitate predicting replication health with background replication.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
creating a group of at least one file on a source computer, wherein the group of at least one file is configured to test data backup operations, and wherein the group of at least one file is separate from data that is to be backed up;
performing iterations of backing up the group of at least one file to a destination computer;
storing respective job status indications of respective iterations of the iterations of backing up the group of at least one file; and
in response to determining to back up the data, and
in response to determining that the job status indications indicate that at least one iteration of the iterations of backing up the group of at least one file was successful, backing up the data to the destination computer, or
in response to determining that the job status indications indicate that the iteration of the iterations of backing up the group of at least one file was unsuccessful, refraining from backing up the data to the destination computer.

2. The system of claim 1, wherein the operations further comprise:
determining a recommended time at which to initiate backing up the data based on the job status indications; and
sending an indication of the recommended time.

3. The system of claim 1, wherein the respective job status indications indicate whether the respective iterations of backing up the group of at least one file succeeded.

4. The system of claim 1, wherein the respective job status indications indicate whether was a failover success or a failback success associated with the respective iterations of backing up the group of at least one file succeeded.

5. The system of claim 1, wherein the operations further comprise:
before performing iterations of backing up the group of at least one file to the destination computer, setting up backups from the source computer to the destination computer.

6. The system of claim 1, wherein the operations further comprise:
in response to the determining that the job status indications indicate that the at least one iteration of the iterations of backing up the group of at least one file was unsuccessful, creating an event or an alert that indicates a reason why the at least one iteration of the iterations of backing up the group of at least one file was unsuccessful.

7. The system of claim 1, wherein respective iterations of the iterations of backing up the group of at least one file are performed at a time interval, and wherein a value of the time interval is determined in response to receiving time interval data associated with a user account.

8. The system of claim 1, wherein respective iterations of the iterations of backing up the group of at least one file are performed at a time interval, and wherein a value of the time interval is determined independently of receiving time interval data associated with a user account.

9. A method, comprising:
performing, by a system comprising a processor, iterations of backing up a group of at least one file from a source computer to a destination computer, wherein the group of at least one file is configured for testing data backup operations, and wherein the group of at least one file is separate from data that is to be backed up;
storing, by the system, respective job status indications of respective iterations of the iterations of backing up the group of at least one file; and
in response to determining back up the data, and
in response to determining that the job status indications indicate that at least one iteration of the iterations of backing up the group of at least one file was successful, backing up, by the system, the data to the destination computer, or
in response to determining that the job status indications indicate that the at least one iteration of the iterations of backing up the group of at least one file was unsuccessful, refraining from backing up, by the system, the data to the destination computer.

10. The method of claim 9, further comprising:
receiving, by the system, replication mode data associated with a user account, wherein the replication mode data indicates to perform the iterations of backing up the group of at least one file, before performing the iterations of backing up the group of at least one file.

11. The method of claim 9, further comprising:
creating, by the system, the group of at least one file based on determining to perform the iterations of backing up the group of at least one file.

12. The method of claim 11, wherein respective files of the group of at least one file have respective sizes, and wherein creating the respective files comprises:
creating the respective files with the respective sizes based on file size data received from a user account.

13. The method of claim 11, wherein respective files of the group of at least one file have respective sizes, and wherein creating the respective files comprises:
determining the respective sizes independently of receiving file size data from a user account.

14. The method of claim 9, further comprising:
raising, by the system, an alert in response to determining that a first iteration of the iterations has failed.

15. The method of claim 9, further comprising:
determining, by the system, a recommended time at which to initiate backing up the data based on the job status indications; and
sending, by the system, an indication of the recommended time.

16. A non-transitory computer-readable medium comprising instructions that, in response to execution, cause a system comprising a processor to perform operations, comprising:
performing iterations of backing up a group of at least one file from a source computer to a destination computer;
storing respective job status indications of respective iterations of the iterations of backing up the group of at least one file;
in response to determining to back up data, determining whether the job status indications indicate that at least one iteration of the iterations of backing up the group of at least one file was successful;
in response to determining that the job status indications indicate that the at least one iteration of the iterations of backing up the group of at least one file was successful, backing up the data to the destination computer; and in response to determining that the job status indications indicate that the at least one iteration of the iterations of backing up the group of at least one file was unsuccessful, refraining from backing up the data to the destination computer.

17. The non-transitory computer-readable medium of claim 16, wherein respective iterations of the iterations are initiated after respective time intervals of a time interval have passed.

18. The non-transitory computer-readable medium of claim 16, wherein the group of at least one file is configured for testing data backup operations, and wherein the data differs from the group of at least one file.

19. The non-transitory computer-readable medium of claim 16, wherein the operations further comprise:
   determining a recommended time at which to initiate backing up the data based on the job status indications; and
   sending an indication of the recommended time.

20. The non-transitory computer-readable medium of claim 16, wherein the respective job status indications indicate whether the respective iterations of backing up the group of at least one file succeeded.

\* \* \* \* \*